United States Patent [19]

Fieser et al.

[11] 4,219,113

[45] Aug. 26, 1980

[54] CONVEYOR FOR MOVING HEAVY DENSE OBJECTS

[76] Inventors: Arthur H. Fieser, 9888 W. Moccasin Trail, Wexford, Pa. 15090; Loreley S. Mobley, 4634 Sebald Dr., Franklin, Ohio 45005

[21] Appl. No.: 915,984

[22] Filed: Jun. 16, 1978

[51] Int. Cl.² ............................................. B65G 25/02
[52] U.S. Cl. .................................................. 198/774
[58] Field of Search ............... 198/750, 773, 774, 412, 198/414, 614, 751, 457, 480, 803; 92/9

[56] References Cited

U.S. PATENT DOCUMENTS

| | | | |
|---|---|---|---|
| 2,932,412 | 4/1960 | Martin | 198/414 X |
| 3,176,801 | 4/1965 | Huff | 92/9 X |
| 3,757,931 | 9/1973 | Baker et al. | 198/774 |
| 3,838,769 | 10/1974 | Fishburne et al. | 198/774 X |
| 4,024,946 | 5/1977 | Müller et al. | 198/774 X |
| 4,071,137 | 1/1978 | Fink | 198/774 |

*Primary Examiner*—James L. Rowland
*Attorney, Agent, or Firm*—Robert D. Yeager

[57] ABSTRACT

A conveyor system which is particularly suitable for moving large very heavy dense loads such as steel coils. The conveyor includes a stationary portion and a movable portion which is raised and moved forward to move the load forward. The movable portion is then lowered, so that the load is supported on the stationary portion, and moved backward to be in position for another movement of the load. The movable portion is supported on air bearings during the forward and return steps to reduce friction. The disclosed conveyor can be used for moving loads a relatively long distance, often over 1000 ft. (304.9 meters). Thus, for a practical device low friction operation is necessary. Adjustable guides are provided so that the movable load support can be accurately positioned with respect to the stationary load support. Air lifting units are provided for raising and lowering the movable load support. Hydraulic cylinders are provided for moving the movable load support back and forth. A turntable can be provided for receiving and transferring loads from the movable load support. The turntable is formed with a top portion which has passages which are complimentary with the end of the movable load support so that the movable load support can move into the turntable and transfer the load thereto. The load support surface of the turntable is supported on air bearings to permit easy rotation. A strong center stud is provided extending into the center of the turntable for keeping the turntable accurately aligned.

18 Claims, 17 Drawing Figures

CONVEYOR FOR MOVING HEAVY DENSE OBJECTS

BACKGROUND OF THE INVENTION

1. Field of the Invention

This invention relates to conveyors and more particularly to a walking beam type conveyor which is particularly suitable for moving heavy high density loads.

2. Description of the Prior Art

Walking beam or reciprocating conveyors for progressively moving an aritcle along a linear path are well known in the prior art. U.S. Pat. Nos. 3,736,997; 3,838,769; 3,850,287; and 4,037,714 are exemplary of this type of prior art Lift and Lay or Walking Beam conveyor.

U.S. Pat. No. 3,796,162 and U.S. Pat. No. 3,757,931 teach a conveying system which utilizes air bearings for moving selected heavy loads such as modular housing frames. The loads are of a relatively light density and are relatively large. These large loads span and are moved on two or more parallel conveyor systems. The conveyor systems disclosed in U.S. Pat. Nos. 3,796,162 and 3,757,931 are not particularly suitable for moving heavy dense loads, such as steel coils, over a relatively long distance.

Flat top conveyors have been utilized for moving steel coils a relatively long distance within a steel mill. Wean Industries provides a coil moving conveyor wherein steel coils are placed onto saddle-type cars, which are propelled by special dog chains.

In many steel mills the conveyors for moving heavy dense loads are usually massive, having large drives and requiring rather deep floor pits to accommodate the conveyor. These conveyors are often a very high maintenance item.

SUMMARY OF THE INVENTION

A conveyor system is disclosed which is particularly suitable for moving large relatively dense loads, such as steel coils or slabs, over a substantial distance. The conveyor system includes two fixed spaced apart supports for supporting the item being moved. A movable support which can be raised and lowered and moved forward and backward is disposed between the pair of fixed supports. Air bearings are provided on which the movable member moves forward and backward. Air lifts can be provided for gently raising the movable support when inflated. Adjustable guides are provided all along the conveyor for accurately guiding the movable portion with respect to the spaced apart fixed supports. A linear positioning device such as a hydraulic cylinder is provided for moving the movable portion back and forth.

The fixed supports include two flat parallel longitudinally extending support surfaces. These movable supports include a top surface which is above the fixed support surface when in the raised position and which is below the fixed support surface when in the lowered position. The top of the support is secured to an upper flat plate. A lower flat plate is disposed beneath the upper flat plate. An air bearing is provided between the upper and lower plate. The air bearing can be of the air cushion type such as shown and described in U.S. Pat. No. 3,757,931 and can be attached to either the upper or lower plate. The relative position of the air bearings and air lifts can be interchanged if desired. Likewise, the orientation of the air bearing units can be reversed if desired.

Pneumatic air lift units are disposed beneath the lower plate for raising and lowering the lower plate, the upper plate and the movable load support members. The upper load support can be moved back and forth by appropriate air or hydraulic cylinders. The upper plate is wider than the opening between the fixed support surfaces and is disposed beneath the fixed support surfaces. The upper plate includes flanges depending from its sides which extend lower than the air cushion bearing and the lower plate when the air cushion bearing is inflated.

As pointed out above the relative position and orientation of the air bearing units and the air lifting units can be varied as desired. Depending on their position and orientation both the air bearing units and the air lifting units can be made stationary or movable, alternately either can be made stationary while the other is movable.

The construction of the disclosed embodiments permits the air cushion bearings to be used on both the forward and return stroke of the movable load support. The side guides are preferably of the adjustable type which utilizes rollers for engaging the movable load support. The adjustable guides are attached to the undersides of the fixed load support surfaces. These guides are disposed at frequent intervals along the conveyor length so that when a coil is moved it is accurately positioned at each step. This is very important since the air lift units permit the assembly which they are raising to move slightly to one side or the other. For a relatively long conveyor a small movement, such as a 16th of an inch (1.59 mm), on each step could result in the coil being moved to the side and forced off the conveyor. The guides which are adjustable permit the conveyor to be in operation for a relatively long distance and still keep the coils accurately aligned. The guides can be adjusted to assure that the coils will move accurately down the center of the conveyor. In conveyors, such as those disclosed in U.S. Pat. No. 3,757,931, accurate alignment of the load is not a problem. Accurate centering of the coil is particularly important when a transfer turntable is utilized. In one embodiment a proximity sensor is provided for sensing the position of the coils. The sensor controls a guide adjusting mechanism for automatically adjusting the guides to maintain the coils in the desired position.

A turntable is disclosed which is constructed with a top portion which is complimentary with the end of the movable support. The movable support can when moved forward move into the turntable and transfer a load thereto. The turntable is supported on an air bearing for low friction and ease of movement. When the air bearings are inflated they raise the top portion of the turntable above the fixed spaced apart supports. A center fixed stud extends through the center of the rotatable portion of the turntable to keep the turntable accurately aligned.

A relatively short independently controlled section of conveyor can be used immediately before the transfer table to assure that the coil moves accurately onto the proper position on the transfer table. That is, the short section can be controlled so that the coil is in the proper longitudinal position for movement onto the transfer table. Standard sensors such as photoelectric, proximity or limit switches can be utilized for the control of the short conveyor section to assure that a coil is accurately moved onto the conveyor or the transfer table.

The disclosed conveyor can be constructed with the stationary top fixed at floor level if desired. This positioning of the conveyor permits easy passage thereover.

It is an object of this invention to teach a conveyor system which can move heavy steel coils efficiently and accurately over a long distance.

It is a further object of this invention to teach a walking beam conveyor for transferring heavy dense loads wherein air lifting units are used for raising and lowering the movable member and air bearings support the movable member for low friction back and forth movement of the movable member.

It is yet a further object of this invention to teach a walking beam conveyor wherein both the forward and return strokes are accomplished on air bearings.

BRIEF DESCRIPTION OF THE DRAWINGS

For a better understanding of the invention, reference may be had to the preferred embodiments exemplary of the invention shown in the accompanying drawings in which.

DETAILED DESCRIPTION OF THE PREFERRED EMBODIMENTS

Figure 1:
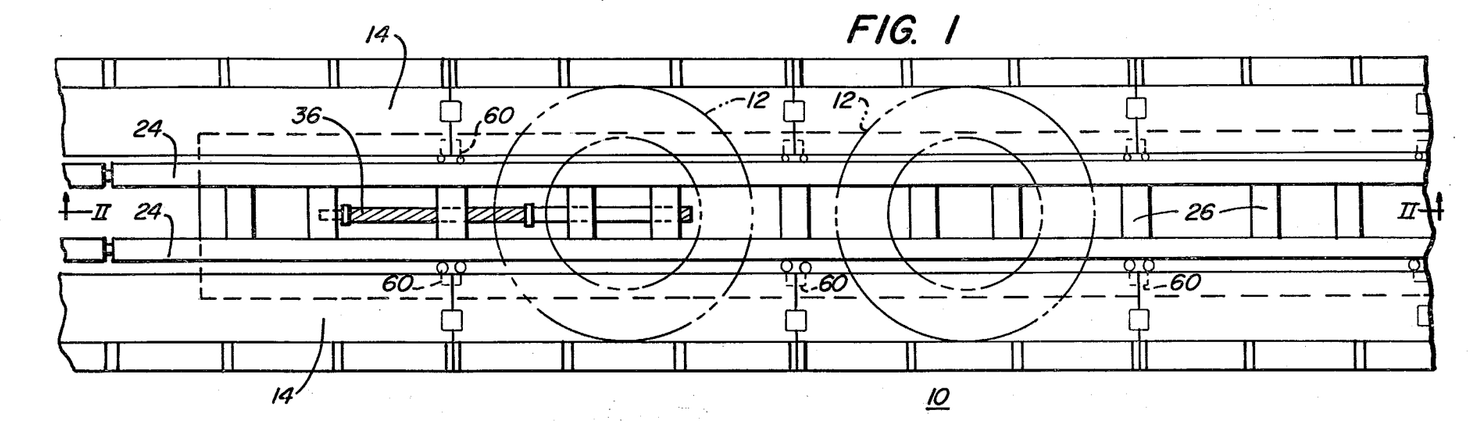
FIG. 1 is a top view of a conveyor constructed according to the teaching of the present invention.
Figure 2:
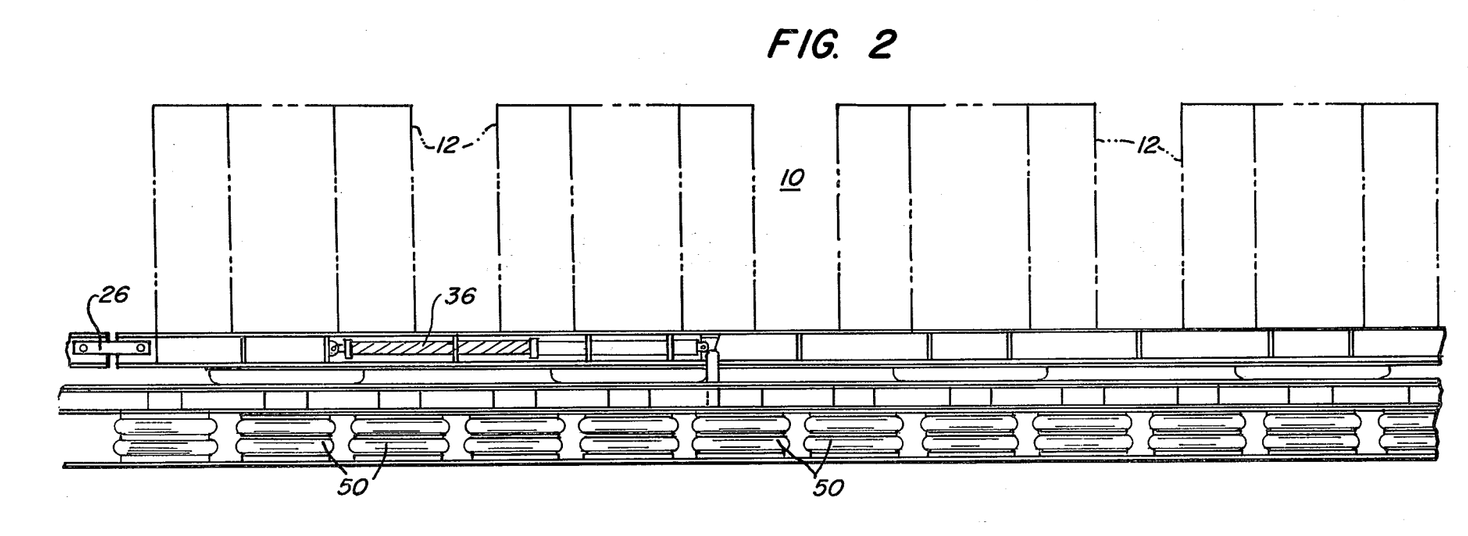
FIG. 2 is a side view of the conveyor shown in FIG. 1 along the lines II—II showing the air lift units in the inflated or raised position.
Figure 3:
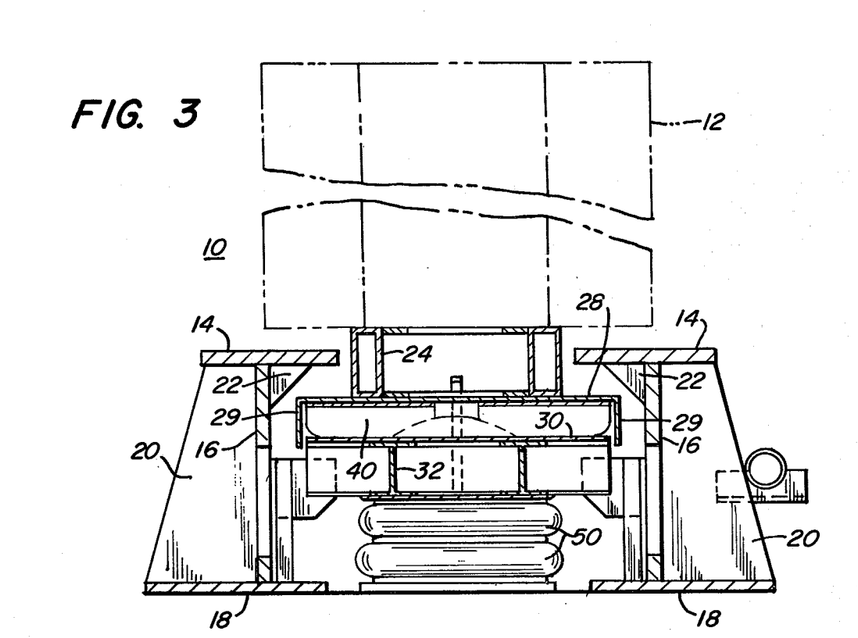
FIG. 3 is a section view through the conveyor unit shown in FIG. 2.

Referring now to the drawings and FIGS. 1 through 3 in particular there is shown a conveyor system 10 which is particularly suitable for moving large heavy steel coils 12. Steel coils 12 are a very heavy, high density load weighing on the average from 10,000 to 90,000 lbs. or more. Conveyor 10 moves the coils 12 forward in steps. During operation coils 12 are lifted slightly moved forward a step and set down into place. The moving mechanism is then brought back to the original position and another step is initiated. The coils 12 may be hot and are moved over a rather long distance, often in excess of 1,000 feet (304.9 meters). Various drive means can be located at intervals along the conveyor, for a long line the moving sections may be joined together so that all coils move in unison. It is very important for this conveyor that each move be made accurately since if the coils move off center there is a danger that they may tip over. This is especially important in the move onto the disclosed turntable 80 since the coil lifting area is smaller. Conveyor 10 can be supported from the floor or, if desired, lowered so that the top is at floor level. If the top of the conveyor is at floor level the operating mechanism will be installed below floor level. A pair of parallel flat fixed support members 14 provide a stationary support for coils 12. Structural members 16 and 18 are provided for fixing the fixed load support 14 at the desired height. An appropriate number of supports and gussets 20 and 22 are provided along conveyor 10 to ensure that load carrying surface 14 has the necessary structural strength. A pair of box beams 24 are disposed between the spaced apart parallel support members 14. The box beams 24 are joined together at frequent intervals by cross members 26. Box beams 24 are the movable support members which raise and move the coils forward during each step. When a conveyor is constructed links 26 are provided between longitudinally adjacent sets of box beams 24. These links 26 assure that all of the box beams will move forward and backward in unison. That is, the movable load support can be formed from a number of different pieces but they are all connected together so that they must move forward and backward together. Thus during each step all coils are moved forward by the same amount. This construction assures that if the drive means associated with one section is weak or defective the driving forces from the other section will be utilized to move this section the necessary distance. Means are provided for raising and lowering box beams 24 and for moving box beams 24 forward and backward.

In an alternate construction the various sections can be constructed for independent movement from the sections ahead and behind. This construction would be useful where it is desired to change the spacing between the carried loads.

The bottoms of box beams 24 are rigidly connected to an upper plate 28. A lower plate 30 is provided beneath upper plate 28. Air bearing units 40 are provided at frequent intervals between plates 28 and 30. The air bearings 40 provide a very low friction movement between plates 28 and 30. Air bearings 40 are utilized when plate 28 is moved both forward and backward with respect to lower plate 30. It is very important in a long conveyor that the air bearings be used both for forward and backward movement of the movable members. Prior art conveyors, for example as shown in U.S.

Pat. No. 3,757,931, are not constructed for a return stroke on air bearings and this severely limits their application for long conveying systems. Also if the loads moved are very heavy then a heavy movable support is required and this would be a problem for prior art conveyors. The air bearing units 40 are preferably of the type manufactured by Rolair Systems, Inc., Santa Barbara, Calif. 93105. The air bearing units 40 are mounted in close proximity along conveyor 10. The air bearings or air lift units as air bearings are sometimes called, are widely used today. Typical prior art air lift units are shown in U.S. Pat. Nos. 3,161,247; 3,243,004; and 3,321,038. Typical air bearing units as manufactured by Rolair utilize a rigid upper member and a flexible lower wall member which are joined together to define a generally toroidal or annular chamber. Means are provided for introducing air under pressure into the chamber and into the central space enclosed by the toroidal chamber. Air flows out from the central space, under the toroidal chamber in the air cushion bearing unit 40 so that the air cushion unit 40 rests on a film of air which permits substantially frictionless longitudinal movement of upper plate 28. The air flows between air cushion units 40 and lower plate 30 so that the air cushion units 40 are spaced apart by a thin layer of air from lower plate 30.

Lower plate 30 is supported by various structural members 32 from air lift units 50. Air lift units 50 are preferably of the type manufactured by Firestone Industrial Products Company, Noblesville, Ind. 46060. If desired other suitable lift units which, for example, are hydraulically or mechanically operated can be used in place of air lift units 50. The air lift units 50 are formed with a flexible reinforced rubber body which is inflatable. When an air lift unit 50 is inflated the load is supported on the air trapped within the flexible body. Two units 50 are stacked vertically, at each position, for raising the load. The stacked pairs of these units 50 are disposed at close spacing along the conveyor 10. When the air lift units 50 are inflated the upper surface of box beams 24 rises above the upper fixed supports 14 and lifts coils 12. The box beams 24 which provide the upper movable load support can then be moved on the almost frictionless surface provided by air cushions 40.

During a typical movement box beams 24 are moved forward one step, and air lift units 50 are then deflated and box beams 24 settle gently to a position lower than fixed supports 14, so that coil 12 is supported by fixed supports 14. Box beams 24 are then moved back, on air cushions 40, to the starting position so that the sequence can be repeated to move the coil 12 step by step down conveyor 10.

Hydraulic cylinders 36 are provided at intervals along conveyor 10 for moving box beams 24 forward and backward. Other types of operating mechanisms such as rack and pinions, electric screws, pneumatic cylinders or the like can be utilized for moving box beams 24. The length of each step taken by box beams 24 during each operating cycle is determined by the stroke of cylinder 36. Since for each conveyor length for which unitary movement is desired all of the box beams 24 are tied longitudinally together if there is a slight difference in the stroke length of any cylinder 36 this will not affect operation. All of the box beams 24 in each portion of a section which are joined together move forward the same distance with each step. A typical stroke length for hydraulic cylinder 36 is 5 feet (1.524 meters). Thus, for a long conveyor several hundred steps may be required to move the coils the length of the conveyor. Air lift units 50 have a tendency when supporting a heavy load to move or lean slightly to one side or the other. If coil 12 is moved off center even a very slight amount on each step it may be moved off the conveyor due to the large number of steps taken. It is thus critical that coil 12 be maintained very near the center of conveyor 10 and move in a very straight line without moving off center. Guides 60 are provided for maintaining the movable box beams in a proper orientation. Guides 60 can be made with a rotating member or with a stationary low friction shoe formed of oil-lite, bronze, Teflon, or the like. If the guides are formed with a stationary shoe they may require lubrication to lessen wear. The particular method and material required will be determined by the desired operating performance.

Figure 6:
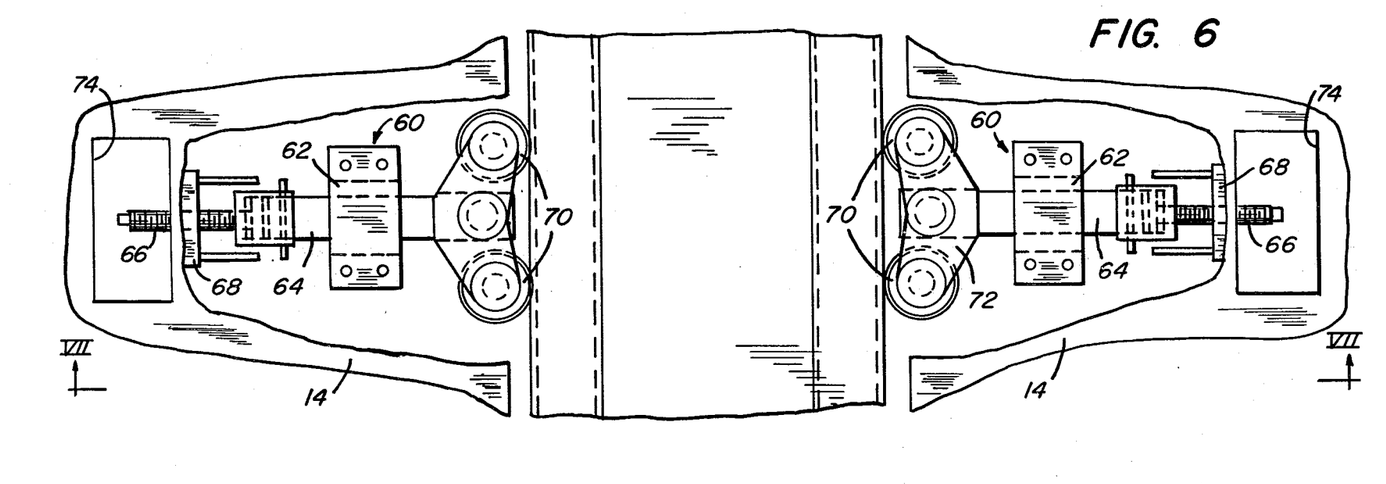
FIG. 6 is an enlarged top view of a portion of the conveyor section shown in FIG. 1 showing in more detail an adjustable guide.
Figure 7:
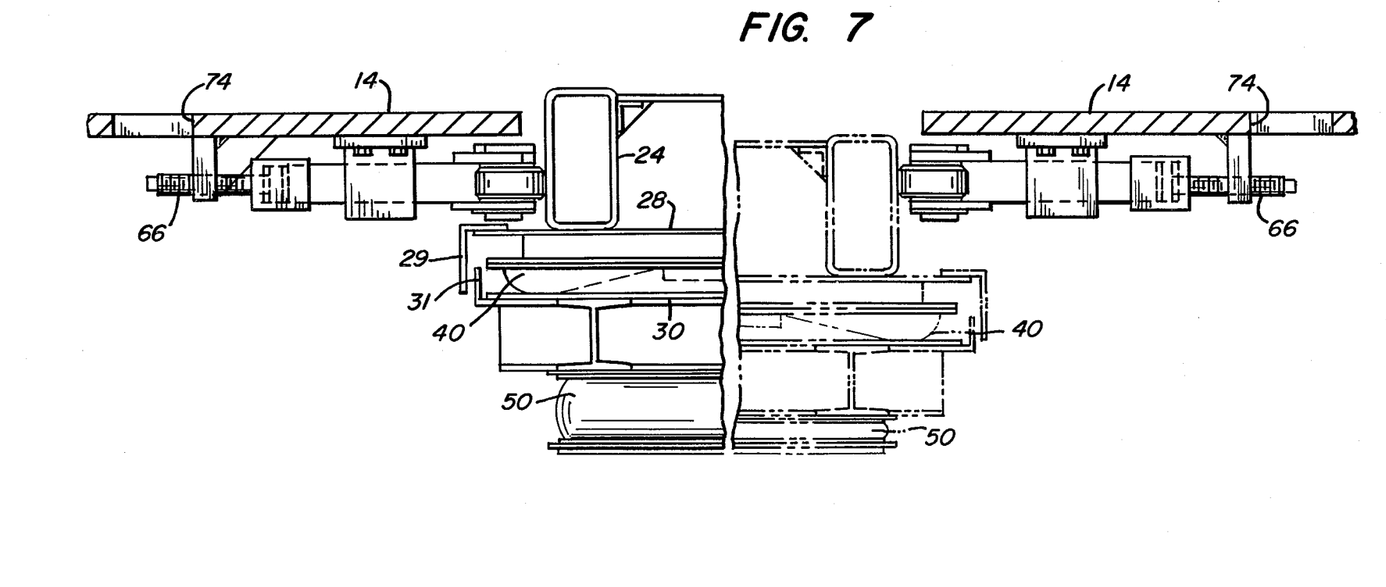
FIG. 7 is a view generally along the line VII—VII in FIG. 6 with part of the movable portion of the conveyor shown in phantom in the lowered position.

Preferably guides 60 are made adjustable so that during operation they can be adjusted to assure that the coils move accurately down the conveyor 10. Guides 60 are provided at frequent intervals along conveyor 10 to assure accurate movement of the movable members over the entire conveyor 10 length. Referring now to FIGS. 6 and 7 there is shown a preferred embodiment of adjustable guides 60. Adjustable guides 60 are secured to the underside of support 14 to engage the side of box beams 24. A fixed collar 62 which is attached to fixed support 14 supports a shaft 64. Fixed collar 62 supports shaft 64 for sliding movement along its longitudinal axis. A threaded shaft 66 engages an internal screw thread on a fixed member 68. Threaded shaft 66 is connected to the end of rod 64 so that they move together along their longitudinal axis. Member 68 is securely fastened to another support 14. A pair of rollers 70 are provided in a bifurcated bracket 72 which is attached to the other end of shaft 64. The position of rollers 70 can thus be moved forward or backward relative to collar 62 by turning threaded member 66. A square end is provided on the end of threaded member 66 to facilitate turning by an appropriate tool. Alternately an operating handle or power drive can be provided for positioning threaded member 66. An opening 74 is provided in fixed support 14 to permit guides 60 to be adjusted from the top of conveyor 10. Adjustable members 60 are positioned to prevent any sideward movement of box beams 24 during a step. If during operation it is noted that box beams 24 are moving slightly to either side at any location along conveyor 10 an appropriate guide 60 is adjusted to correct this movement. This, with all guides 60 properly adjusted a coil can move the entire length of conveyor 10 without being displaced from the center position.

Figure 8:
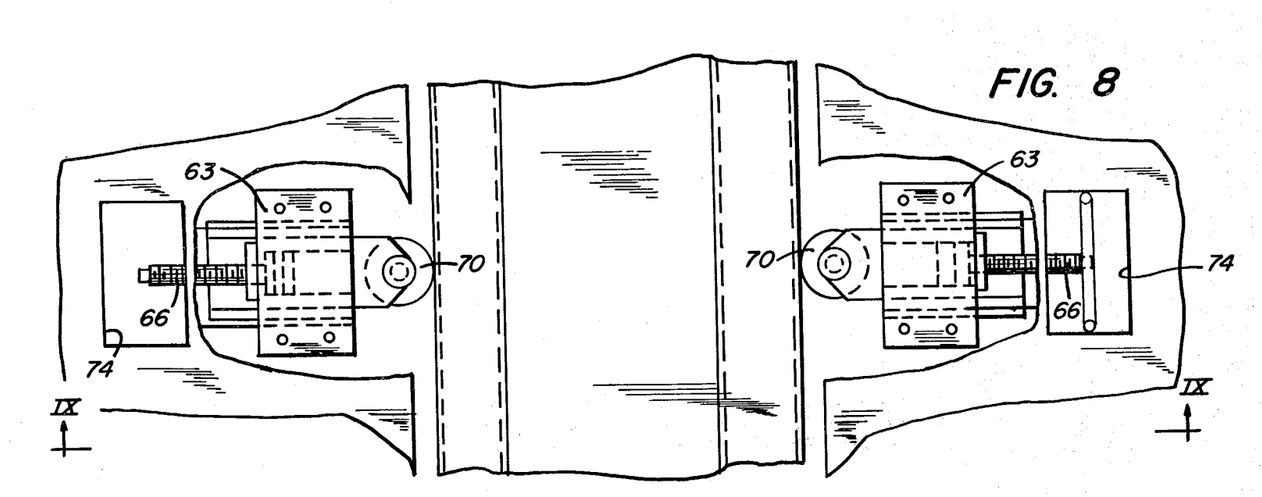
FIG. 8 is similar to FIG. 6 but showing another embodiment of the guide.
Figure 9:
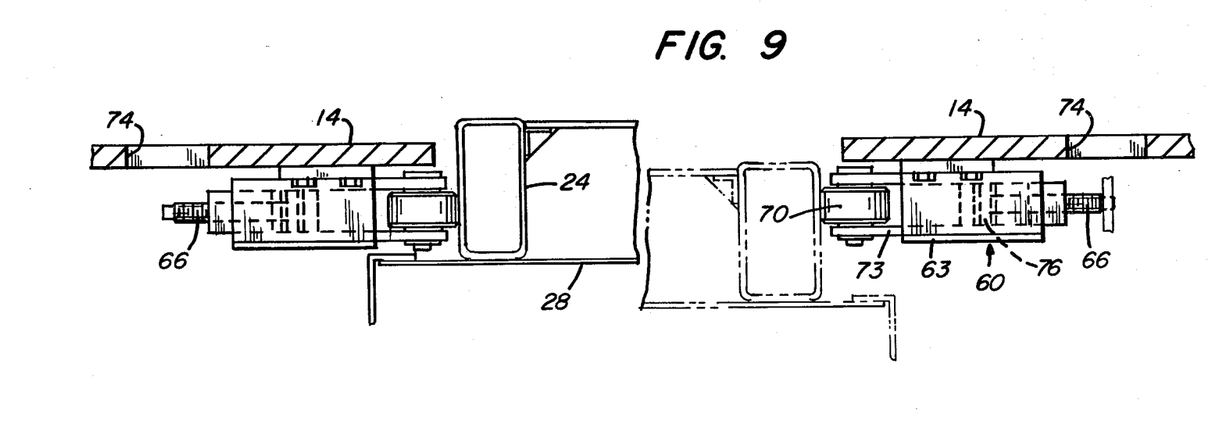
FIG. 9 is a view in FIG. 8 along the line IX—IX with part of the movable portion shown in the lowered position.

Referring now to FIGS. 8 and 9 there is shown another embodiment of adjustable guide 60. In the embodiment shown in FIGS. 8 and 9 a single roller 70 is utilized. A slot or opening 74 is provided in the top fixed surface 14 to facilitate adjustment of threaded members 66. Threaded members 66 engage a fixed member 76 which is attached to the inside of collar 63. A bifurcated bracket 73 supports roller 70. As threaded member 66 is turned, wheel support member 73 is moved either forward or backward in support and guide bracket 63.

Figure 14:
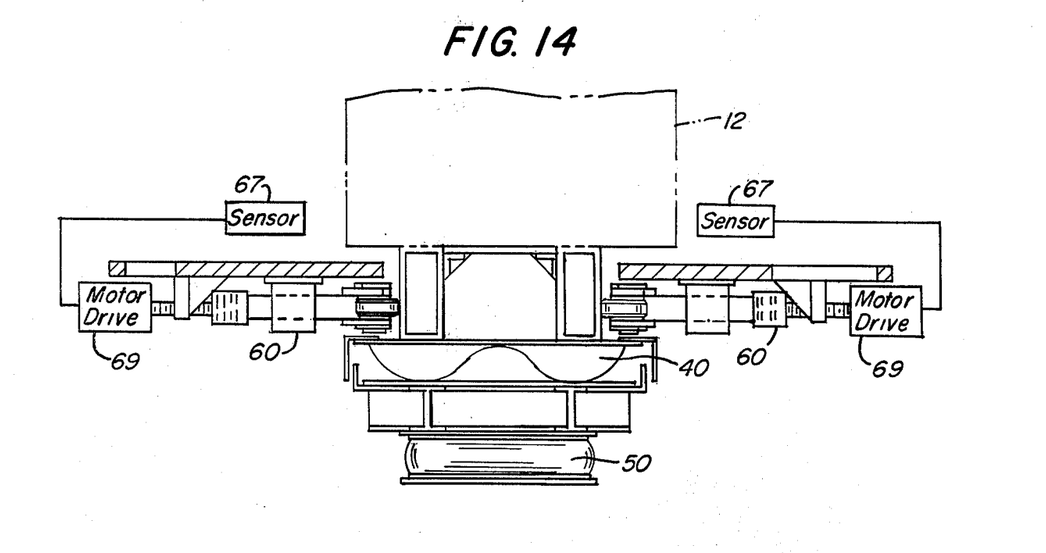
FIG. 14 is a section view of an embodiment wherein the position of the coils is sensed and utilized for automatically adjusting the guides.

Referring now to FIG. 14 there is shown an embodiment wherein the guides 60 are automatically adjusted. Proximity sensors 67 are disposed to sense the location of coils 12 that move along conveyor 10. A proximity sensor 67 is associated with each guide 60. Proximity sensor 67 controls automatic adjusting apparatus 69 which adjusts the position of the associated adjustable guide 60. Sensor 67 controls apparatus 69 to maintain coils 12 at the desired position. There are numerous ways of automatically sensing the coil position and adjusting the guides to control movement of box beam 24. A magnetic detector could be provided to sense the presence of the coil and then control an electric screw operated device to drive the side guides to a position where the box beams are centered. The electric screw could be operated until the sensors outputs are electrically balanced indicating that the coil is centered therebetween. Other methods and apparatus are available, some are very sophisticated and some very simple. The exact device and method selected will be dictated by local conditions and requirements of a particular installation.

Upper plate 28 includes downward longitudinally extending flanges 29. These downward extending flanges 29 are outside of lower plate 30. Flanges 29 extend in a downward direction past plate 30. Flanges 29 are made of a sufficient length to extend beyond a plate 30 even with air supplied to air cushion units 40. Flanges 29 prevent dirt or other debris from getting under the air cushion unit 40. Flanges 29 also direct the air coming out from air cushion unit 40 in a downward direction. The air which comes out from under air cushion unit 40 provides the near frictionless surface for the movable portion of conveyor 10. In an alternative embodiment as shown in FIG. 7 lower plate 30 can be provided with an upward extending flange 31 provided inward of depending flanges 29. With this construction flange 29 extends past the upper end of flange 31.

Figure 13:
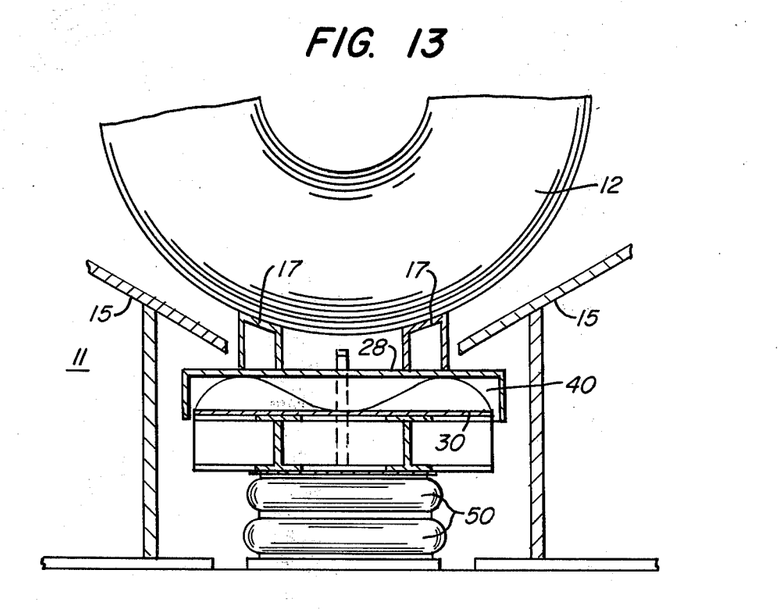
FIG. 13 is a section view similar to FIG. 3 of an embodiment wherein the coils are carried in a saddle-type holder.

Referring now to FIG. 13 there is shown an embodiment wherein the coils are not standing on end and are arranged with their longitudinal axes aligned. In this embodiment the conveyor 11 is formed with a slanted stationary top surface 15. Movable slanted top surfaces 17 are provided for raising and moving forward coils 12. Providing the top surface in a slanting configuration as shown in FIG. 13 facilitates maintaining coil 12 at a centered location. Other than for the slanted fixed and slanted movable top surfaces, the construction and operation of conveyor 11 is similar to the construction and operation of conveyor 12 as set forth above.

Figure 4:
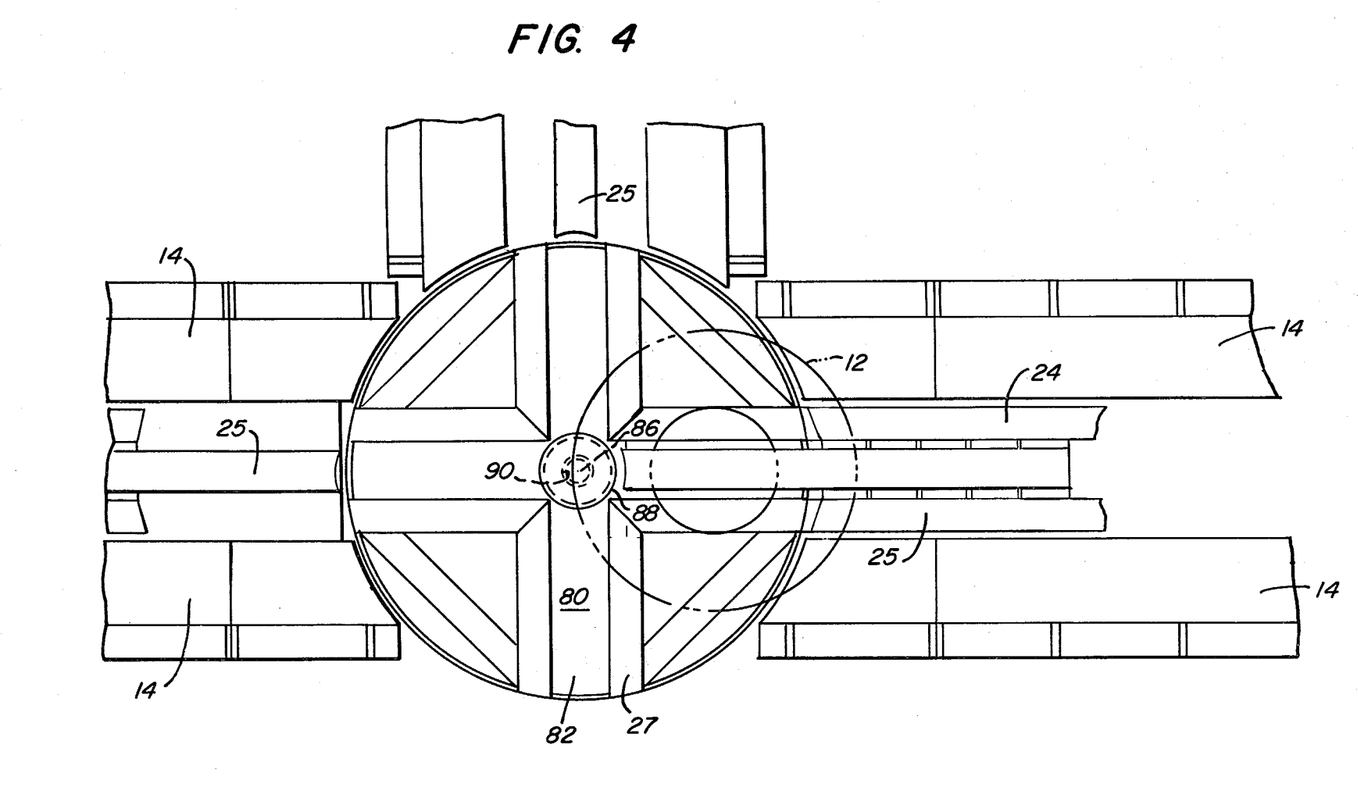
FIG. 4 is a top view of conveyor unit according to the teaching of the present invention showing a turntable section in place.
Figure 5:
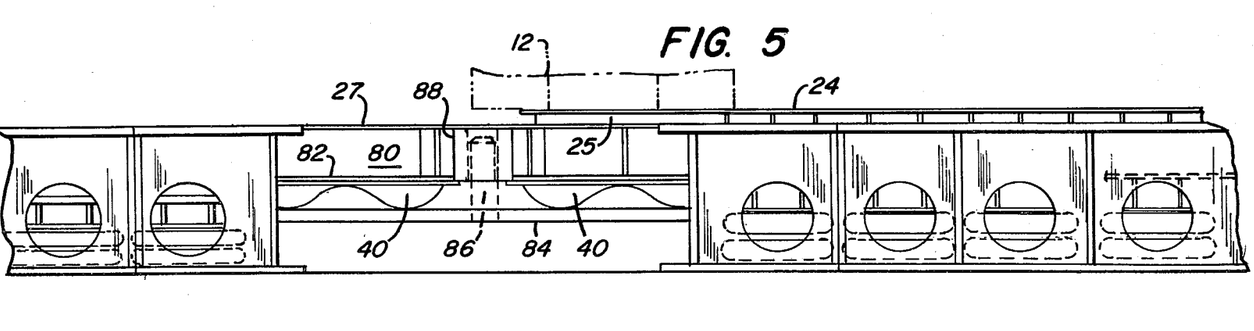
FIG. 5 is a side view of the conveyor section shown in FIG. 4.

Referring now to FIGS. 4 and 5 there is shown a turntable 80 which can form part of the conveyor system 10. Box beams 24 at their end which abuts turntable 80 have a centered member 25 supported therebetween. Centered member 25 extends past the ends of box beams 24. Turntable 80 includes top structural members 27 which form the top load carrying portions thereof. Structural members 27 are disposed on the top of turntable 80 to provide longitudinal openings or passages into which member 25 can extend when the associated box beams 24 are in a forward position. Note that the load carrying area of member 25 is narrower than the load support surfaces of box beams 24 and thus accurate center alignment of the coils when being lifted by member 25 is necessary.

During an operation as shown in FIG. 5 the coil 12 is carried on members 25 when member 25 moves into turntable 80. When box beams 24 are lowered and retracted, coil 12 is carried by the top surface of turntable 80. Positioning of coil 12 on turntable 80 should be accurately controlled. To facilitate this a short section of conveyor 10 can be provided immediately prior to turntable 80. This short section of conveyor 10 can be controlled accurately with respect to turntable 80 to accurately position the coil on turntable 80. Common prior art sensors such as proximity switches or photoelectric devices can be utilized for accurately sensing the coil position and operating the short section of conveyor 10 accordingly.

Turntable 80 includes a circular plate 82 upon which structural support members 27 are placed. Air bearings 40 are disposed around plate 82. A fixed member 84 is provided beneath plate 82. A large center stud 86 projects upward from plate 84. The top of turntable 80 includes a center spindle 88 with a center opening 90 therein. Stud 86 projects into opening 90 to guide the top of table 80. When a coil is placed on turntable 80 there will be some off center loading on stud 86. Turntable 80 is constructed to support the coils slightly above fixed surfaces 14 so that when a coil is supported on turntable 80 it can easily rotate to another position where the coil can be removed by another conveyor section. Inflating air bearings 40 raises the top surface, and any supported load, slightly above the fixed surfaces 14. Turntable 80 can be used when a change in the direction of conveyor 10 is needed.

Figure 10:
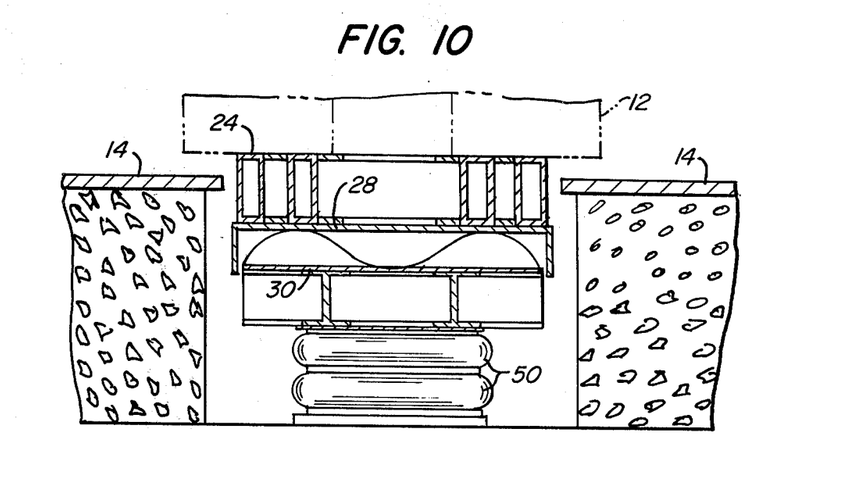
FIG. 10 is a section view similar to FIG. 3 illustrating a second preferred embodiment of the invention wherein the air bearing and lifting unit are not moved along the longitudinal axis of the conveyor.

Referring now to FIG. 10, which is similar to FIG. 3, there is shown a section view of a conveyor 10 wherein the air bearing or cushion 40 is fixed to plate 30. When air bearing 40 is inflated an air film is formed between air bearing 40 and plate 28 providing for a low friction movement therebetween. In this embodiment both the air bearing 40 and the air lift units 50 are maintained in a relatively stationary location and are only raised and lowered. For this arrangement air bearing 40 and air lift unit 50 can be connected by relatively fixed connections to the air supply. In the embodiment shown in FIG. 10, air bearing 40 does not move longitudinally along conveyor 10, rather its only movement is an up and down movement caused by the inflating or deflating of air lift units 50. Only a short section of flexible air hose is required to compensate for inflating and deflating of air bearing 40 and air lift unit 50. A suitable drive mechanism is connected to plate 28 for moving it back and forth. Conveyor 10 shown in FIG. 10 is disposed so that its fixed upper surface 14 is flush with the floor. When air lift units 50 are deflated the box beam structures 24 are located slightly below floor level. The operating mechanism is installed in a pit beneath the floor level. This construction permits easy passage over conveyor 10. The air lift unit 50 and air bearing 40 arrangement shown in FIG. 10 will probably be the type most often used since it requires the least movement of air bearing 40 and air lift unit 50.

Figure 11:
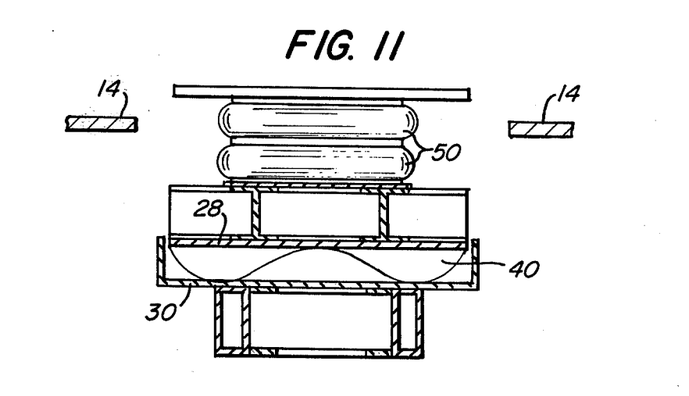
FIG. 11 is a section view similar to FIG. 3 illustrating another embodiment wherein the position of the air bearing and lifting unit are reversed.

Referring now to FIG. 11 there is shown another embodiment of the invention, similar to the embodiment shown in FIG. 3, but with the positions of air bearings 40 and air lift units 50 reversed. In this embodiment both the air bearing 40 and the air lift unit 50 must move longitudinally with conveyor 10.

Figure 12:
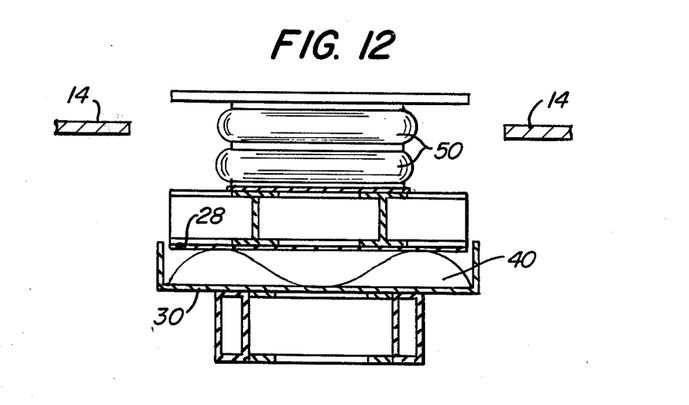
FIG. 12 is a section view similar to FIG. 10 of another embodiment wherein the position of the air bearing and lifting unit are reversed.

Referring now to FIG. 12 there is shown an embodiment of conveyor 10 similar to the embodiment shown in FIG. 11 but with the air bearing 40 orientation reversed. In the embodiment shown in FIG. 12 air bearing 40 is attached to a fixed plate and is completely stationary. Air lift units 50 which are disposed above air bearings 40 are movable longitudinally with each step of conveyor 10.

Figure 15:
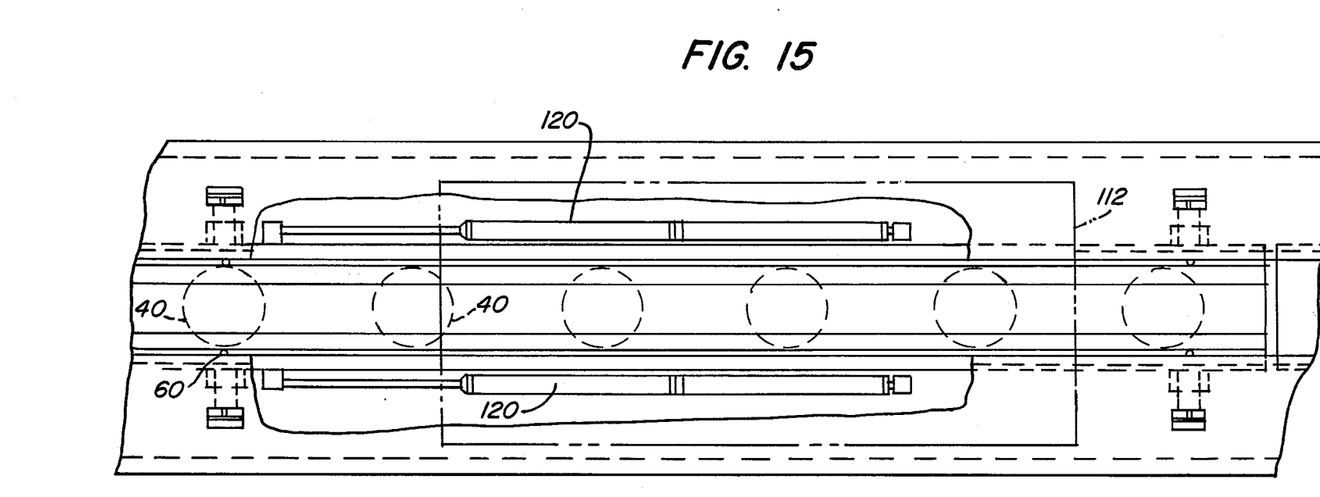
FIG. 15 is a top view of a conveyor, carrying slabs, which is contructed according to the present invention.
Figure 16:
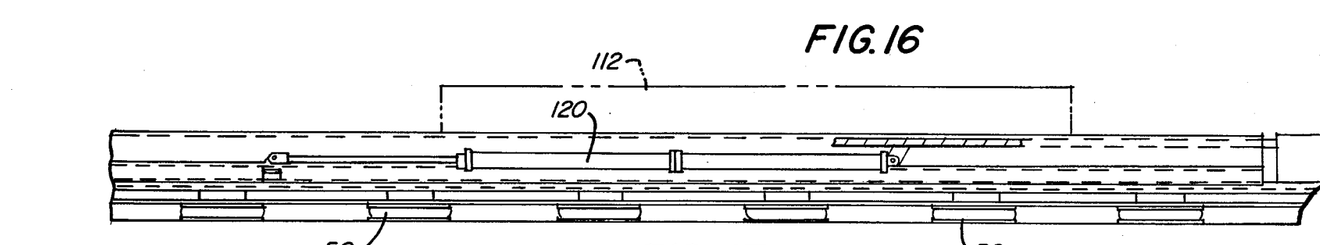
FIG. 16 is a side view with portions removed for clarity of FIG. 15.
Figure 17:
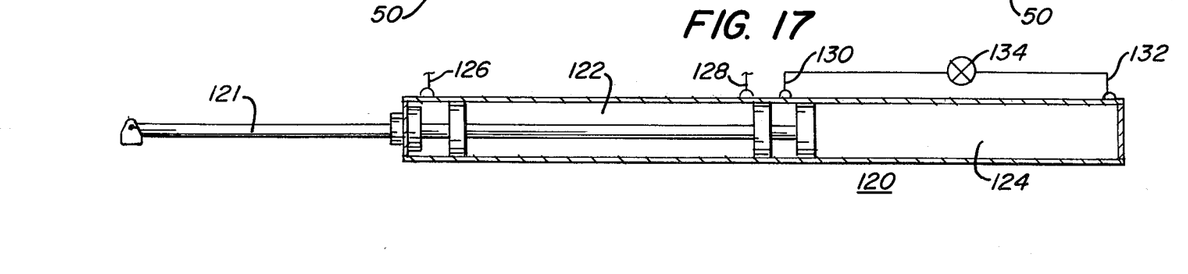
FIG. 17 is a section view of the air/hydraulic cylinders used on the embodiment shown in FIG. 15.

Referring now to FIGS. 15, 16 and 17 there is shown another embodiment of conveyor 10 constructed according to the teaching of the present invention. In this embodiment conveyor 10 is shown carrying elongated heavy steel slabs 112. Operation of the conveyor shown in FIGS. 15 and 16 is similar to the operation described above. In this embodiment two air/hydraulic cylinders 120 are provided on each side of movable member 124. For the cylinders 120 shown air is the primary motive force and a separate pressurized hydraulic system is eliminated. Two cylinders 120 are utilized, one on each of the outboard sides of the movable section 124. When two cylinders are used they can be of a smaller diameter than a single cylinder. Two cylinders 120 tend to equalize the force and result in a straight thrust being applied to movable member 124.

An enlarged section view of the air/hydraulic cylinder 120 is shown in FIG. 17. Cylinder 120 includes an air operating chamber 122 and a hydraulic fluid control chamber 124. Chambers 122 and 124 are separated by a sealing member disposed between ports 128 and 130. Air provides the operating force and the hydraulic fluid in chamber 124 controls the speed of operation of cylinder 120. To operate cylinder 120 air is applied to the appropriate port 126 or 128. Two openings 130 and 132 are formed into the hydraulic fluid chamber of piston 120. Openings 130 and 132 are connected by appropriate piping with a fluid control valve disposed therebetween. By adjusting the amount of fluid allowed to pass through control valve 134 the speed of operation of cylinder 120 can be controlled. That is the speed of operation of the operating rod 121 of piston 120 can be controlled by regulating the amount of fluid which can pass through valve 134. Various piping arrangements can be provided to control the speed of operation of rod 121 in either direction. Rod 121 can be controlled to travel slow in one direction and fast in the other direction. During operation transfer of hydraulic fluid in chamber 124 around the internal piston prevents a sudden force from being applied to movable rod 121 when air is applied to operating cylinder 120.

Air is introduced into the various air lifting units 50, air operating cylinders 120, and air bearings 40 from a header which runs lengthwise parallel to conveyor 10. Appropriate solenoid valves are coupled to the cylinders 120 and lifting units 50 to control operation. Air will be introduced into the lifting units 40 causing the entire movable unit to rise under the load 112. When the extreme elevated position is reached a proximity switch will activate selected solenoid valves to introduce air into port 128 of air/hydraulic transfer cylinder 120. When the operating rod 121 of cylinder 120 is fully extended, a sensor will send a signal to the appropriate solenoid valves to exhaust air from the lifting units 30 and to reverse the air connection of the transfer cylinder 120. Air is then applied to port 126. The operating rod 121 of cylinder 120 will then retract to bring movable plate 124 back to its initial starting position. When rod 121 is fully retracted a sensor will provide a signal to appropriate solenoid valves to again introduce air into the lifting units and then to provide air to extend operating rod 121. This sequence of operation is continued repeatedly to move the load 112. A manual override will be installed to enable operator control when desired. The disclosed conveyor is highly efficient for moving heavy dense loads over a relatively long distance.

What is claimed is:

1. A conveyor for moving heavy dense objects comprising:
   a fixed elongated load support having two fixed spaced apart support surfaces, defining a longitudinal passage therebetween, positioned above the floor;
   a movable elongated load support, disposed between the two fixed support surfaces of said fixed elongated load support, movable between a raised position above said fixed elongated load support and a lowered position beneath said fixed elongated load support;
   an upper plate secured to the bottom of said movable elongated load support;
   a lower plate disposed beneath said upper plate;
   air bearing means disposed between said upper plate and said lower plate for providing low friction relative movement between said upper plate and said lower plate when activated;
   drive means connected to said movable elongated load support for reciprocating said movable elongated load support only when said air bearing means is activated;
   lift units connected beneath said lower plate for raising and lowering said lower plate which in turn raises and lowers said second movable load support;
   guide means for guiding said movable elongated load support as it moves;
   sensing means for sensing the position of the objects moved by the conveyor; and,
   automatic adjusting means connected to said guide means and responsive to said sensing means for automatically adjusting said guide means to maintain the moved objects at a desired position.

2. A conveyor as claimed in claim 1 wherein:
   said upper plate is wider than the opening defined by the two fixed spaced apart support surfaces ad extends beneath said fixed two spaced apart support surfaces.

3. A conveyor as claimed in claim 2 wherein:
   said upper plate includes downward extending flanges on each side which extend beyond the plane defined by said lower plate.

4. A conveyor as claimed in claim 2 wherein:
   said lower plate includes upward extending flanges on each side; and,
   said upper plate includes downward extending flanges on each side which extend downward past the top of the upward extending flanges on said lower plate.

5. A conveyor as claimed in claim 1 wherein said drive means comprises:
   a pair of cylinders, disposed beneath said fixed elongated support with one disposed on each side of said movable elongated load support, each having an air operating chamber and a fluid speed control chamber.

6. A conveyor comprising:
   a fixed elongated load support having two fixed spaced apart support surfaces, defining a longitudinal passage therebetween, positioned above the floor;
   a movable elongated load support, disposed between the two fixed support surfaces of said fixed elongated load support, movable between a raised position said fixed elongated load support and a lowered position beneath said fixed elongated load support;
   an upper plate secured to the bottom of said movable elongated load support;
   a lower plate disposed beneath said upper plate;

air bearing means disposed between said upper plate and said lower plate for providing low friction relative movement between said upper plate and said lower plate when activated;

drive means connected to said movable elongated load support for reciprocating said movable elongated load support only when said air bearing means is activated;

lift units connected beneath said lower plate for raising and lowering said lower plate which in turn raises and lowers said second movable load support;

a plurality of guides disposed on each side of said movable elongated load support for guiding said movable elongated load support as it moves;

adjusting means for adjusting the position of said plurality of guides;

sensing means for sensing the position of the objects moved by the conveyor; and, adjustment drive means controlled by said sensing means and connected to said plurality of guides for automatically adjusting said plurality of guides to maintain the moved objects at a desired position.

7. A conveyor as claimed in claim 6 wherein:

said air bearing means comprises a plurality of air cushions each securely fastened to said upper plate for movement therewith; and, an opening formed in the two spaced apart support surfaces to permit said guides to be adjusted from above.

8. A conveyor as claimed in claim 6 wherein:

said air bearing means comprises a plurality of air cushions each securely fastened to said lower plate.

9. A conveyor as claimed in claim 8 wherein:

said drive means comprises a pair of cylinders one disposed on each side of said movable elongated load support for causing reciprocating movement thereof.

10. A conveyor for moving heavy dense objects comprising:

a fixed elongated load support having two fixed spaced apart support surfaces, defining a longitudinal passage therebetween, positioned above the floor;

a movable elongated load support, disposed between the two fixed support surfaces of said fixed elongated load support, movable between a raised position above said fixed elongated load support and a lowered position beneath said fixed elongated load support;

an upper plate secured to the bottom of said movable elongated load support;

a lower plate disposed beneath said upper plate;

air bearing means disposed between said upper plate and said lower plate for providing low friction relative movement between said upper plate and said lower plate when activated;

drive means connected to said movable elongated load support for reciprocating said movable elongated load support only when said air bearing means is activated;

lift units connected beneath said lower plate for raising and lowering said lower plate which in turn raises and lowers said second movable load support; and, a turntable having a top which is formed from structural members some of which are spaced apart to receive therebetween a portion of said movable elongated support so that an object carried by said movable elongated support can be transferred thereto.

11. A walking beam conveyor comprising:

a pair of spaced apart fixed load supports;

a movable support, having an upper support surface for supporting a load, disposed between said pair of spaced apart fixed load support surfaces, movable between a raised position wherein the upper support surface is above said pair of fixed supports and a lowered position wherein the upper surface is beneath said fixed supports and said movable support being supported for back and forth movement;

an upper plate connected beneath and supporting said movable load support;

a lower plate connected beneath said upper plate;

air bearing means disposed between said upper and lower plates for permitting low friction movement therebetween;

lift means connected for raising and lowering said movable support;

drive means connected to said movable load support for moving said movable load support back and forth only when said air bearing means is activated; and, guide means connected to said pair of spaced apart fixed supports for engaging said movable load support to guide said movable load support with respect to said pair of fixed load supports.

12. A conveyor as claimed in claim 11 comprising:

adjusting means for adjusting the position of said guide means; and, openings formed in said pair of spaced apart fixed load supports to permit positioning said adjusting means from the conveyor top.

13. A walking beam conveyor comprising:

a pair of spaced apart fixed load supports;

a movable support, having an upper support surface for supporting a load, disposed between said pair of spaced apart fixed load support surfaces, movable between a raised position wherein the upper support surface is above said pair of fixed supports and a lowered position wherein the upper surface is beneath said fixed supports and said movable support being supported for back and forth movement;

an upper plate connected beneath and supporting said movable load support;

a lower plate connected beneath said upper plate;

air bearing means disposed between said upper and and lower plates for permitting low friction movement therebetween;

lift means connected for raising and lowering said movable support;

drive means connected to said movable load support for moving said movable load support back and forth;

guide means connected to said pair of spaced apart fixed supports for engaging said movable load support to guide said movable load support with respect to said pair of fixed load supports;

adjusting means for adjusting the position of said guide means; and, a turntable having a load support top which includes openings for receiving a portion of said movable support when said movable support is moved forward.

14. A conveyor as claimed in claim 13 wherein said upper plate means comprises:

a pair of side flanges extending downward past the top of said lower plate means.

15. A conveyor as claimed in claim 13 wherein:
said lift means comprises resilient air inflatable air lifting units; and comprising,
sensors disposed on each side of the conveyor for sensing the position of articles carried by the conveyor; and,
adjusting means responsive to said sensors for adjusting the guides to maintain the articles at a desired position between the sensors.

16. A turntable for receiving and transferring items moved along a walking beam conveyor comprising:
a top support means formed from a plurality of structural members some of which are spaced apart to define passages which are complimentary with the adjacent ends of the movable portions of the walking beam conveyor and having a center bushing;
a movable upper support disposed beneath and supporting said top support means;
a fixed lower plate disposed beneath said upper support plate;
air bearing means disposed between said upper support plate and said lower plate; and,
a fixed guide pin extending upward from said fixed lower plate to engage the bushing in the center of said top support.

17. A turntable as claimed in claim 16 wherein:
said air bearing means comprises a plurality of air cushions having a fixed plate which is securely fastened to said fixed lower plate.

18. A turntable as claimed in claim 16 wherein:
said air bearing means comprises a plurality of air cushions having a fixed plate which is securely fastened to said movable upper plate.

* * * * *

UNITED STATES PATENT AND TRADEMARK OFFICE
CERTIFICATE OF CORRECTION

PATENT NO. : 4,219,113
DATED : August 26, 1980
INVENTOR(S) : Fieser, Arthur H. et al.

It is certified that error appears in the above-identified patent and that said Letters Patent are hereby corrected as shown below:

Column 4, line 16, after "conveyor," insert --however,--.

Column 6, line 50, delete "This" and substitute therefor --Thus--.

Column 9, line 43, delete "40" and substitute therefor --50--.

Column 10, line 34, delete "ad" and substitute therefor --and--.

Column 10, line 63, after "tion" insert --above--.

Column 14, line 1, after "support" insert --plate--.

Signed and Sealed this

Second Day of December 1980

[SEAL]

Attest:

SIDNEY A. DIAMOND

Attesting Officer     Commissioner of Patents and Trademarks